United States Patent
Albrecht et al.

(10) Patent No.: US 9,472,211 B2
(45) Date of Patent: *Oct. 18, 2016

(54) WRITE HEAD DESIGNED FOR ADJUSTING RELATIVE WRITE PHASE BETWEEN SUBTRACKS OF A PATTERNED MEDIA HYPERTRACK

(71) Applicant: HGST Netherlands B.V., Amsterdam (NL)

(72) Inventors: Thomas R. Albrecht, San Jose, CA (US); Prakash Kasiraj, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/480,539

(22) Filed: Sep. 8, 2014

(65) Prior Publication Data

US 2014/0376124 A1    Dec. 25, 2014

Related U.S. Application Data

(63) Continuation of application No. 13/314,029, filed on Dec. 7, 2011, now Pat. No. 8,848,314.

(51) Int. Cl.
| | |
|---|---|
| *G11B 5/127* | (2006.01) |
| *G11B 5/09* | (2006.01) |
| *G11B 5/596* | (2006.01) |
| *G11B 5/74* | (2006.01) |

(Continued)

(52) U.S. Cl.
CPC ............. *G11B 5/09* (2013.01); *B82Y 10/00* (2013.01); *G11B 5/012* (2013.01); *G11B 5/11* (2013.01); *G11B 5/3116* (2013.01); *G11B 5/596* (2013.01); *G11B 5/746* (2013.01); *G11B 2005/0005* (2013.01)

(58) Field of Classification Search
USPC ............... 360/75, 58, 125.3, 119.02, 119.03, 360/119.04
See application file for complete search history.

(56) References Cited

U.S. PATENT DOCUMENTS

| | | |
|---|---|---|
| 6,937,421 B2 | 8/2005 | Rubin et al. |
| 6,977,108 B2 | 12/2005 | Hieda et al. |

(Continued)

FOREIGN PATENT DOCUMENTS

| | | |
|---|---|---|
| JP | 2004039015 | 2/2004 |
| JP | 2004265474 | 9/2004 |
| JP | 2010231830 | 10/2010 |

OTHER PUBLICATIONS

Requirement for Restriction from U.S. Appl. No. 13/314,029, dated Sep. 10, 2013.

(Continued)

*Primary Examiner* — Tan X Dinh
(74) *Attorney, Agent, or Firm* — Zilka-Kotab, PC

(57) ABSTRACT

A magnetic recording system configured for recording to a bit patterned media using both hypertrack recording and shingled recording. The magnetic recording system includes a write pole with a notched trailing edge that results in a write bubble with a trailing edge that has two outer convex lobes separated by a centrally disposed concave region. By locating one of the lobes over first and second data tracks of a hypertrack, a proper alignment of the relative phase of the two tracks can be maintained. Further adjustment to the alignment can be achieved by adjusting the radial location of the write head.

12 Claims, 10 Drawing Sheets

(51) Int. Cl.
*G11B 5/012* (2006.01)
*G11B 5/31* (2006.01)
*B82Y 10/00* (2011.01)
*G11B 5/11* (2006.01)
*G11B 5/00* (2006.01)

(56) References Cited

U.S. PATENT DOCUMENTS

| | | | |
|---|---|---|---|
| 7,639,450 | B2 | 12/2009 | Hsu et al. |
| 7,688,535 | B2 | 3/2010 | Erden et al. |
| 7,782,561 | B2 * | 8/2010 | Albrecht et al. ............... 360/48 |
| 7,911,724 | B2 | 3/2011 | Buch et al. |
| 8,848,314 | B2 | 9/2014 | Albrecht et al. |
| 2006/0245108 | A1 | 11/2006 | Hsu et al. |
| 2007/0211384 | A1 * | 9/2007 | Hsiao et al. ................... 360/126 |
| 2007/0230046 | A1 * | 10/2007 | Le et al. ....................... 360/126 |
| 2007/0247746 | A1 | 10/2007 | Kim et al. |
| 2007/0258167 | A1 * | 11/2007 | Allen et al. ................... 360/126 |
| 2009/0002868 | A1 | 1/2009 | Mallary et al. |
| 2010/0027605 | A1 | 2/2010 | Sankaranarayanan et al. |
| 2010/0039728 | A1 | 2/2010 | Suzuki |
| 2010/0046118 | A1 | 2/2010 | Lee et al. |
| 2010/0118433 | A1 | 5/2010 | Buch |
| 2010/0265616 | A1 | 10/2010 | Ohtake et al. |
| 2010/0321815 | A1 * | 12/2010 | Zhou et al. ..................... 360/59 |
| 2010/0321825 | A1 * | 12/2010 | Nazarov ................... 360/125.02 |
| 2011/0102942 | A1 * | 5/2011 | Bai et al. ................. 360/125.03 |
| 2011/0205671 | A1 | 8/2011 | Benakli et al. |
| 2012/0314324 | A1 * | 12/2012 | Guan ....................... 360/123.12 |
| 2013/0148228 | A1 | 6/2013 | Albrecht et al. |
| 2013/0155544 | A1 | 6/2013 | Hamasaki et al. |

OTHER PUBLICATIONS

Non-Final Office Action from U.S. Appl. No. 13/314,029, dated Dec. 17, 2013.
Notice of Allowance U.S. Appl. No. 13/314,029, dated May 29, 2014.

* cited by examiner

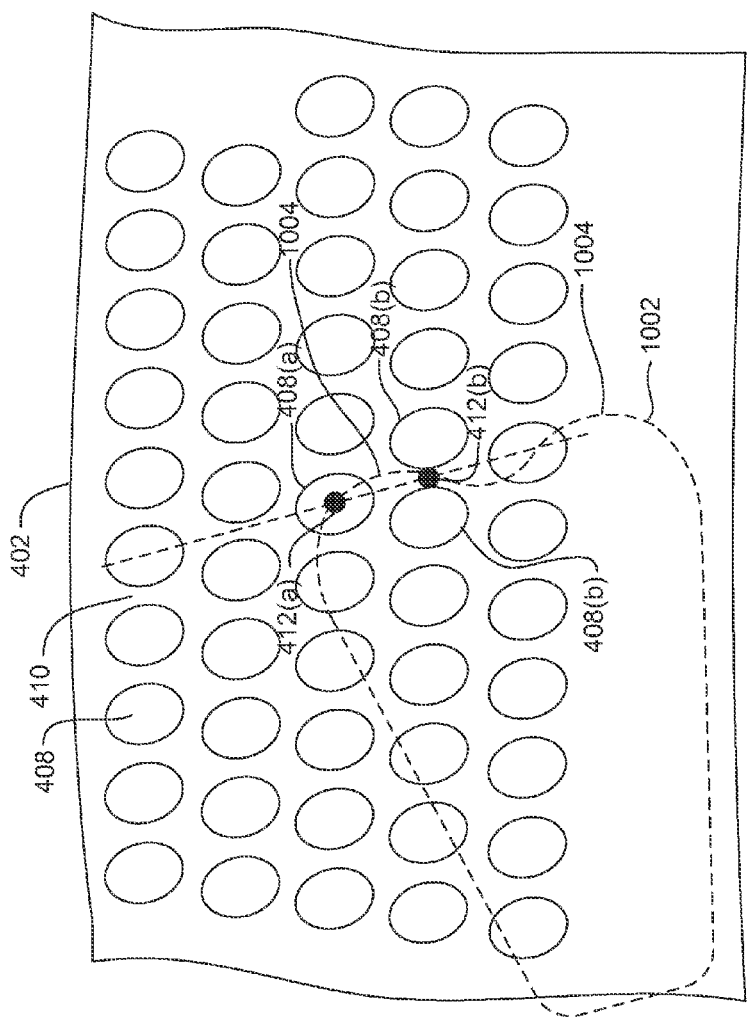

WRITE HEAD DESIGNED FOR ADJUSTING RELATIVE WRITE PHASE BETWEEN SUBTRACKS OF A PATTERNED MEDIA HYPERTRACK

RELATED INVENTIONS

The present application is a Continuation application of commonly assigned patent application Ser. No. 13/314,029, filed Dec. 7, 2011, entitled WRITE HEAD DESIGNED FOR ADJUSTING RELATIVE WRITE PHASE BETWEEN SUBTRACKS OF A PATTERN ED MEDIA HYPERTRACK.

FIELD OF THE INVENTION

The present invention relates to magnetic data recording and more particularly to a system designed to maintain proper phase alignment between sub-tracks of a bit patterned hypertrack.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head can include a magnetic write pole and a magnetic return pole, the write pole having a much smaller cross section at the ABS than the return pole. The magnetic write pole and return pole are magnetically connected with one another at a region removed from the ABS. An electrically conductive write coil induces a magnetic flux through the write coil. This results in a magnetic write field being emitted toward the adjacent magnetic medium, the write field being substantially perpendicular to the surface of the medium (although it can be canted somewhat, such as by a trailing shield located near the write pole). The magnetic write field locally magnetizes the medium and then travels through the medium and returns to the write head at the location of the return pole where it is sufficiently spread out and weak that it does not erase previously recorded bits of data.

A magnetoresistive sensor such as a GMR or TMR sensor can be employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but is free to rotate in response to external magnetic fields. The magnetization of the pinned layer is typically pinned by exchange coupling with an antiferromagnetic layer.

When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode, the resistance of the spin valve sensor changes proportionally to the magnitudes of the magnetic fields from the rotating disk. When a sense current is conducted through the spin valve sensor, resistance changes cause potential changes that are detected and processed as playback signals.

Magnetic recording hard disks drives with patterned magnetic recording media have been proposed to increase data density. In a patterned medium, the magnetic recording layer on the disk is patterned into small isolated data islands arranged in concentric data tracks. To produce the required magnetic isolation of the patterned data islands, the magnetic moment of the spaces between the islands must be destroyed or substantially reduced to render these spaces essentially nonmagnetic. In one type of patterned media, the data islands are elevated, spaced-apart pillars that extend above the disk substrate surface to define troughs or trenches on the substrate surface between the pillars. The magnetic recording layer material is then deposited over the entire surface of the substrate to cover both the ends of the pillars and the trenches. The trenches are recessed from the tops of the pillars so they are far enough from the read/write head to not adversely affect reading or writing.

In a patterned disk, the data islands are equally spaced along single data tracks with the data tracks being equally spaced in the radial or cross-track direction. The data islands are spaced to define a bit aspect ratio (BAR), i.e. the ratio of the cross-track width to the along-the-track width required for a single bit, of near 1:1 because it is difficult to fabricate data islands with BAR much greater than 1:1. However, it is difficult to fabricate heads with the proper performance for very narrow tracks with the data islands having this low BAR. Also, if the single data tracks are too closely spaced, islands in tracks adjacent to the track being written to may be affected by stray magnetic flux from the track being written to. To address these problems, a patterned media disk drive has been proposed with heads that are two tracks wide. This allows the heads to be wider, which makes them easier to fabricate, and also allows the drive to read and write two tracks at a time, thereby doubling the data rate and bringing the performance closer to conventional disk drives. This type of patterned media disk drive (referred to as hypertrack recording) is described in U.S. Pat. Nos. 6,937,421, and 7,782,561 which are incorporated herein by reference. Such recording systems are formed with magnetic bits of adjacent tracks being out of phase with one another. In order for such a system to operate, the relative phase of writing from the write head must be maintained relative to the two tracks. Still another type of system that has been investigated is a system which has been referred to as a shingled recording system, wherein the write head covers several tracks of data but recording only occurs at one edge (e.g. an inner edge or an outer edge).

However a limitation that has remained in the use of such system is that of maintaining a correct phase relationship in a hypertrack recording system when the slider is at an extreme inner or outer location on the disk. This challenge resulting from skew of the slider over the disk is especially problematic when combining hypertrack and shingled recording. This challenge has been so great that, to this point, no system has been developed that to combine both hypertrack and shingled recording.

SUMMARY OF THE INVENTION

Herein is provided a system for magnetic data recording that includes a magnetic media, and a magnetic write head having a magnetic write pole, the magnetic write pole being configured to produce a magnetic write bubble having first and second convex lobes on the magnetic media.

The first and second lobes can be defined on a trailing edge of the write bubble and a centrally disposed concave portion can be defined between the first and second convex lobes.

The present disclosure can also provide a magnetic data recording system that includes a magnetic write head that has a magnetic return pole and a magnetic write pole. The magnetic write pole has a trailing edge, a leading edge and first and second sides each extending from the trailing edge to the leading edge and the trailing edge is formed with a centrally disposed notch.

The notched write pole forms a write bubble that has a tailing edge with first and second outer convex lobes separated by a centrally disposed concave region. This write bubble shape allows writing to a hypertrack with a large portion of the write bubble extending over other tracks in a shingled recording fashion. One of the outer lobes of the write bubble is aligned over the two tracks of the hyper track so that a proper phase relationship between the two tracks can be maintained. Further adjustment of the relative phase relationship can be achieved by slightly adjusting the radial location of the write head.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

FIG. 10 is a top down view of a portion of a patterned magnetic media formed to account for skew and a magnetic write bubble wherein the magnetic recording system uses hyper-tracks along with shingling and wherein the magnetic write bubble is defined by a magnetic write head according to an embodiment of the invention.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
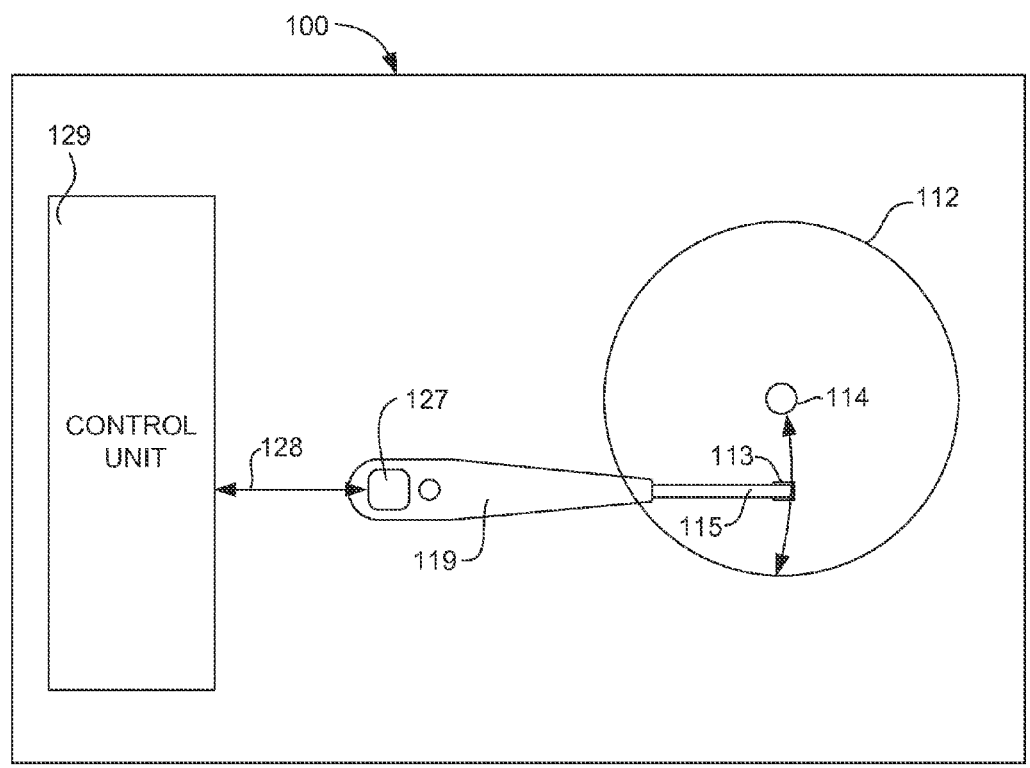
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113, having a magnetic head formed on its trailing edge, is positioned near the magnetic disk 112. As the magnetic disk rotates, slider 113 moves radially in and out over the surface of the disk 112 so that the magnetic head assembly of the slider 113 can access different tracks of the magnetic disk where desired data are written and read. Each slider 113 is attached to an actuator arm 119 by way of a suspension 115. The suspension 115 provides a slight spring force which biases slider 113 against the disk surface 112. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the surface of the disk 112 which exerts an upward force or lift on the slider. The air bearing thus counter-balances the slight spring force of suspension 115 and supports slider 113 off and slightly above the surface of the disk 112 by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as head position and seek control signals on line 128. The control signals on line 128 provide the desired current profiles to optimally move and position slider 113 to the desired data track on disk 112.

Figure 2:
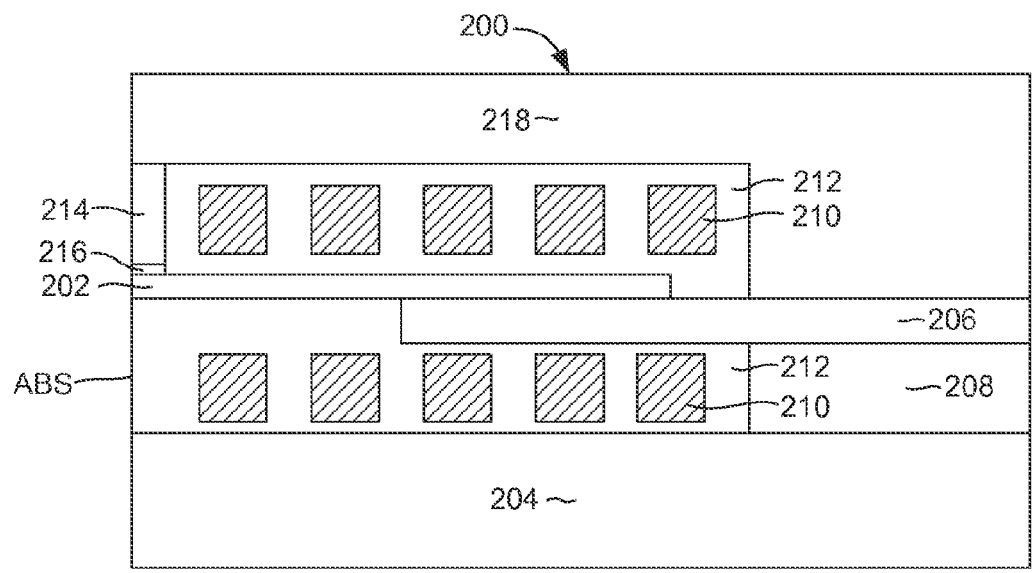
FIG. 2 is a side view of a prior art magnetic write head.

FIG. 2 shows a side view of a magnetic write head 200 according to the prior art as might be formed on the slider 113 described above. The write head includes a write pole 202 and a magnetic return pole 204, both of which extend to the air bearing surface (ABS). The write pole 202 has a cross section at the ABS that is much smaller than that of the return pole 204. The write pole 202 can be connected with a magnetic shaping layer 206 that helps to conduct magnetic flux to the write pole 202. The write pole 202 and shaping layer 206 are magnetically connected with the return pole 204 by a magnetic back gap layer 208 that is located away from the ABS. A non-magnetic, electrically conductive write coil 210 (shown in cross section in FIG. 2) passes between the write pole 202 and the return pole 204, and may also pass above the write pole. The write coil 210 can be embedded in a non-magnetic, electrically insulating fill material 212 such as alumina.

When a current flows the write coil 210, a resulting magnetic field causes a magnetic flux to flow through the write pole 202, shaping layer 206, back gap layer 208 and return pole 204. This results in a write field being emitted from the tip of the write pole at the ABS. This write field travels through the magnetic media 212 (FIG. 1) to return to the return pole, thereby making a magnetic circuit. Because the write pole 202 has a cross section at the ABS that is much smaller than that of the return pole 204, the write field flux from the write pole 202 is highly concentrated and can write a magnetic bit to the magnetic media, whereas the magnetic field returning to the return pole 204 is spread out and weak and does not erase the previously recorded bit.

In order to increase the field gradient of the write field (and thereby confine the write field to the target bit) a trailing magnetic shield 214 can be provided adjacent to the trailing edge of the write pole 202. The trailing magnetic shield 214 is separated from the write pole 202 by a non-magnetic trailing gap 216. The trailing magnetic shield 214 can be connected with a trailing return pole 218, which helps to return magnetic flux from the trailing shield 214 to the back of the write head 200.

Figure 3:
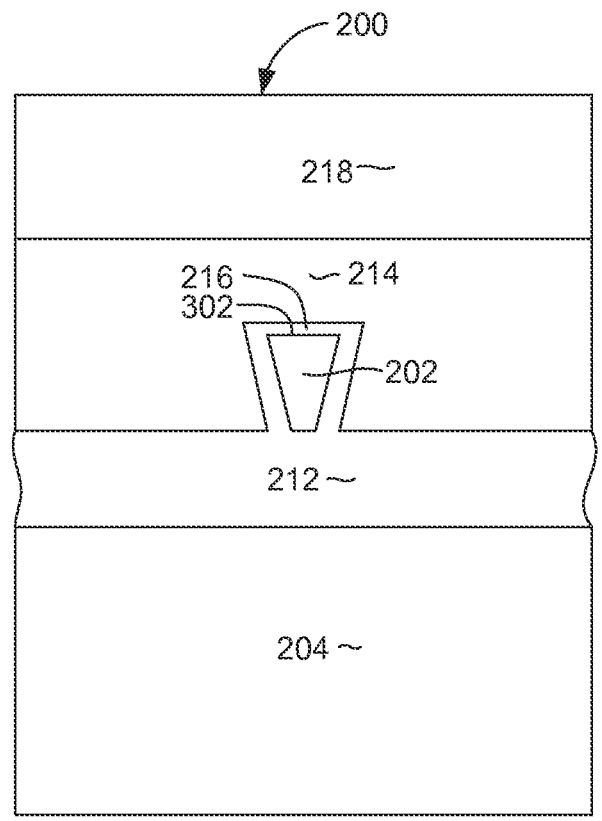
FIG. 3 is an enlarged ABS view of a portion of the prior art magnetic write head of FIG. 2.

FIG. 3 shows an ABS view of a portion of the write head 200, and shows that the write pole 202 has a generally trapezoidal shape with tapered sides and a trailing edge 302 that is larger than the leading edge. This shape helps to avoid skew related adjacent track interference. Also as shown, the trailing magnetic shield 214 can be formed to wrap around the sides of the write pole. This can help to suppress stray field interference.

Figure 4:
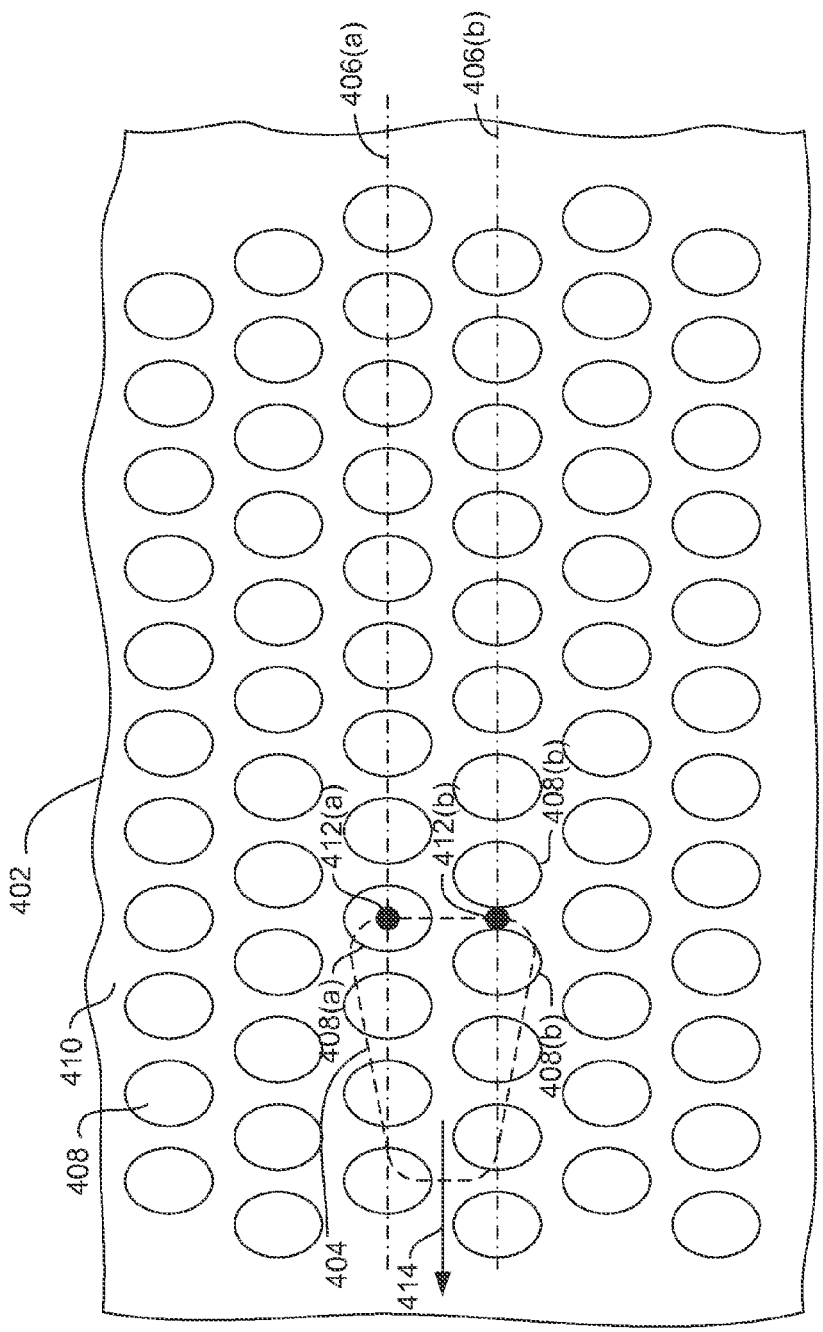
FIG. 4 is a top down view of a portion of a patterned magnetic media having hypertracks and a magnetic write bubble.

FIG. 4 shows a view of an enlarged portion of a bit patterned magnetic media 402 configured for hypertrack recording. The dashed line 404 denotes the outline of a write bubble resulting from a write field from a write pole, such as the trapezoidal write pole 202 described above with reference to FIGS. 2 and 3. As can be seen, the write bubble 404 does not have the exact same trapezoidal shape as the write pole 202 (FIG. 3), but instead has a somewhat trapezoidal shape with rounded corners.

The media is formed with magnetic islands 408 that are separated from one another by non-magnetic regions 410. The most efficient way to arrange such magnetic islands on a patterned media 402 is to arrange them in a staggered arrangement as shown wherein one row of islands 408 is aligned with the spaces between the islands 408 of adjacent tracks of data. This arrangement resembles a hexagonal close packed (HCP) arrangement.

As mentioned above, the media 402 is configured for hypertrack recording. This means that the write bubble 404 (produced by the write pole 202 (FIG. 3)) has a width that spans two adjacent tracks of data 406(a), 406(b). The adjacent tracks 406(a) and 406(b) are staggered so that they are out of phase with one another, such that a bit 408(a) from one track 406(a) is located so that it is aligned with the space between the bits 408(b) of the adjacent track (i.e. out of phase). The black dots 412(a) and 412(b) represent the recording location of the write field form the write bubble 404. As can be seen, one of the write locations 412(a) is located directly over the magnetic island 408(a) in order to record a magnetic bit to that magnetic island 408(a). The other dot 412(b) is located between the islands 408(b) so that it does not record to these bits 408(b).

As the write bubble 404 passes over the media 402 in a direction indicated by arrow 414. The location of recording (dots 412) passes first over an island 408(a) of one track 406(a) and then over an island 408(b) of the other track 406(b). In this way, the write bubble 404 records to two adjacent track simultaneously in a zig-zag fashion. Such a recording system allows for improved data rate in a magnetic medium 402 that has an alternating pattern of magnetic islands 408 as shown.

As can be appreciated, in order for such a system to work, the relative alignment of the recording locations (412(a), 412(b)) must be maintained such that they are aligned at one with an island 408(a) and the other with a space between islands 408(b), as shown in FIG. 4 (e.g. they are out of phase with one another).

Figure 5:
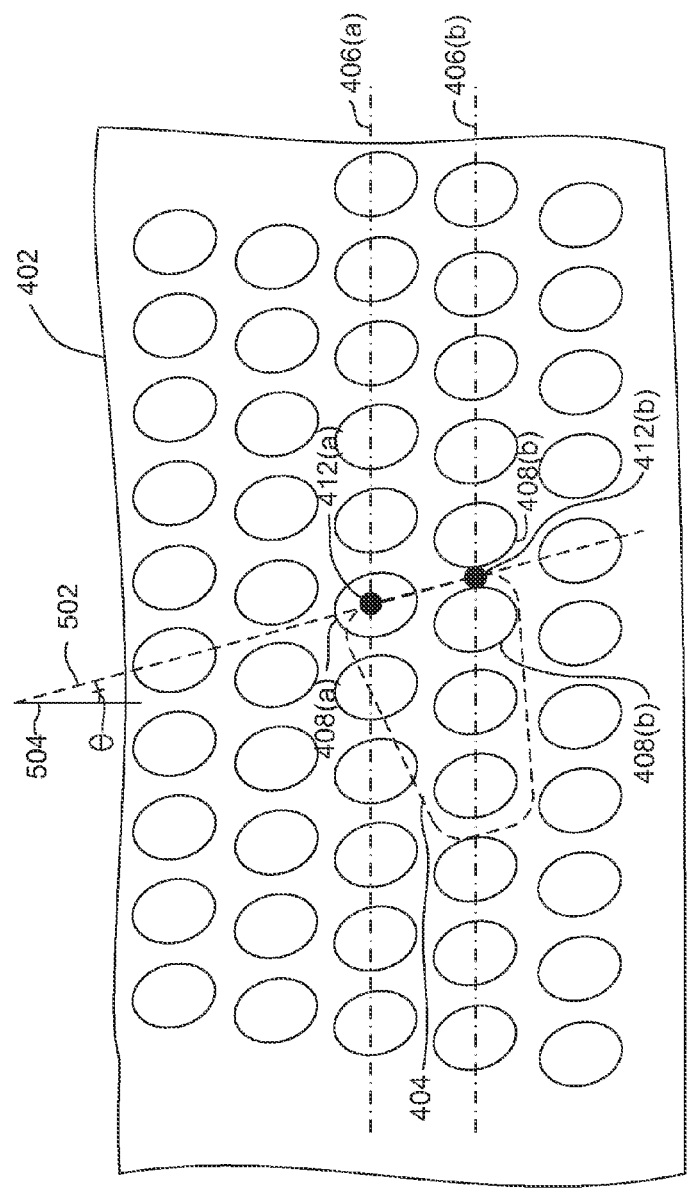
FIG. 5 is a top down view of a portion of a patterned magnetic media formed to account for skew.

As those skilled in the art will appreciate, because the slider 113 is mounted to a rotary actuator 119 (FIG. 1), when the slider is located at an inner our outermost region on the disk, the slider and magnetic head will be skewed at an angle relative to the disk. In order to accommodate this skew in a patterned magnetic media, the pattern of data islands must be skewed accordingly to match the skew of the slider. Such a patterned media is illustrated in FIG. 5. In FIG. 5, the orientation of the data is skewed as represented by dashed line 502 relative to a radial direction 504 by an angle theta Θ that compensates for the skew angle of the slider 113 and the corresponding skew angel of the magnetic write bubble 404. Since the data islands 408 are arranged in a skewed manner to match the skewed orientation of the write bubble 404, the location of the write points 412(a), 412(b) remains correctly oriented relative to the data islands 408(a), 408(b).

As mentioned above, in order to further ensure magnetic stability in magnetic recording systems having very high data density, magnetic recording systems have been developed to employ thermally assisted recording (TAR). In such systems, a slider is equipped with a heating element that locally heats the magnetic media near or at the point of magnetic recording. In a very high magnetic density recording system, the magnetic bits must be very small and very close to one another. This makes the magnetic bits inherently unstable. In order to make the bits stable, the magnetic media must be designed to have a very high magnetic coercivity. However at such a high coercivity, the write head cannot generate a sufficiently high write field to overcome this coercivity and write to the media. A TAR system overcomes this problem by temporarily heating the media at the point of writing which also temporarily lowers the magnetic coercivity of the media, allowing the write head to write to the media. When the media subsequently cools, the recorded data is magnetically stable.

Figure 6:
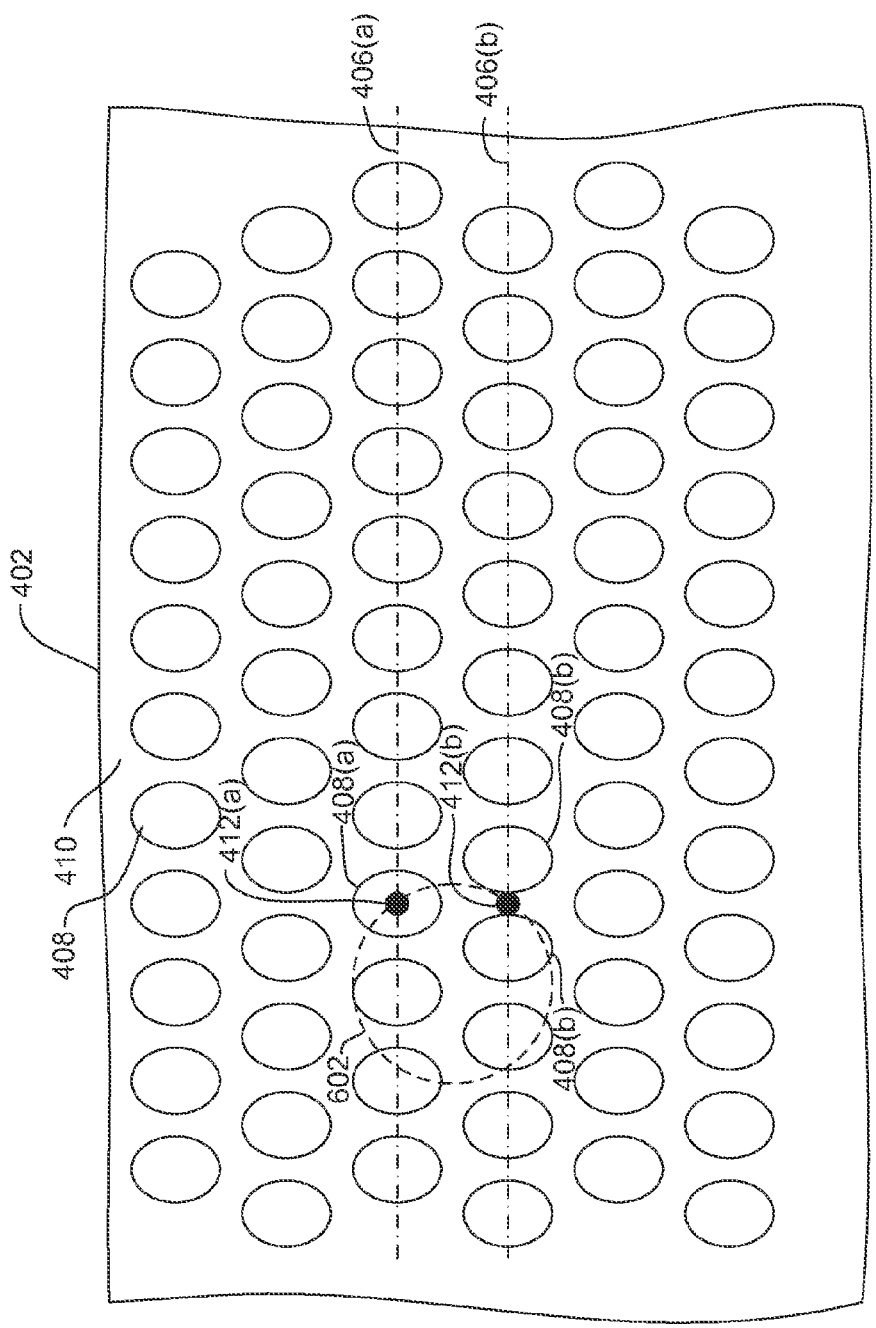
FIG. 6 is a top down view of a portion of a patterned magnetic media and a magnetic write bubble of a thermally assisted magnetic recording system.

In such a TAR system, the shape of the write bubble is dictated by the location of media heating rather than just by the shape of the write pole. This results in a write bubble 602 having a generally round shape as shown in FIG. 6. In a non-skewed portion of the media 402, with the write bubble centered over the two tracks 406(a), 406(b), the leading edge of the round write bubble aligns correctly with the magnetic islands 408(a), 408(b).

However, at an inner or outer portion of the disk, the magnetic islands must be oriented at a skewed angle to match the skewed angle of the slider as discussed above. Those skilled in the art will recognize that the read sensor (not shown) is formed as a series of magnetic and nonmagnetic layers that are formed on the slider and will skew with the slider. Therefore, even though the write bubble 602 is round and is not affected by skew, the data islands still must be skewed to maintain compatibility with the read sensor.

Figure 7:
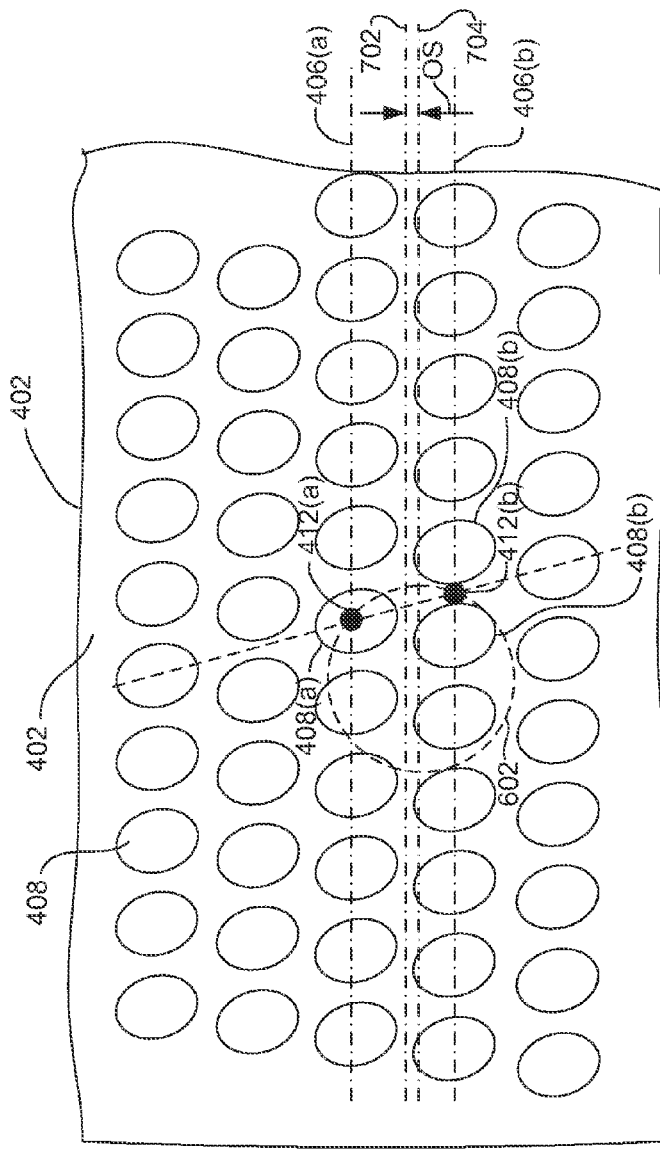
FIG. 7 is a top down view of a portion of a patterned magnetic media formed to account for skew and a magnetic write bubble for a thermally assisted magnetic recording system.

Such a skewed portion of the media is shown in FIG. 7. It can be seen however, that since the write bubble is round the points of writing 412(a), 412(b) do not skew along with the orientation of the data islands 408. If the write bubble 602 were to be centered between the two data tracks 406(a), 406(b), the orientation of the recording points 412(a), 412(b) would not be properly aligned with the islands 408(a), 408(b). However, because the leading edge of the write bubble 602 is curved, this misalignment can be compensated for by slightly offsetting the write bubble 602. In FIG. 7, line 702 represents the centerline between the two tracks 406(a), 406(b), and the line 704 represents the location of the center of the write bubble 602. As can be seen, these lines 702, 704 are offset from one another by a small offset distance OS. This offset compensates for the misalignment of the data recording points 412(a), 412(b) allowing the data points to be properly located over the data islands 408(a), 408(b). Therefore, by providing this offset, a thermally assisted recording system can be implemented in a magnetic recording system that employs hypertrack recording and the compensation for skew related misalignment can be achieved.

However, compensating for such skew related misalignment presents a greater challenge with regard to another type of recording system, one that employs shingled recording. As the size and pacing of magnetic data bits becomes ever smaller it becomes increasingly difficult to produce a sufficiently strong write field from a write pole having a correspondingly small size. In addition, manufacturing limitations make the construction of such a small write head impractical. One way to overcome these limitations is to use a recording system wherein the width of the write pole (and corresponding write bubble) spans several tracks and recording is only performed at one side of the write pole (or corresponding write bubble).

Figure 8:
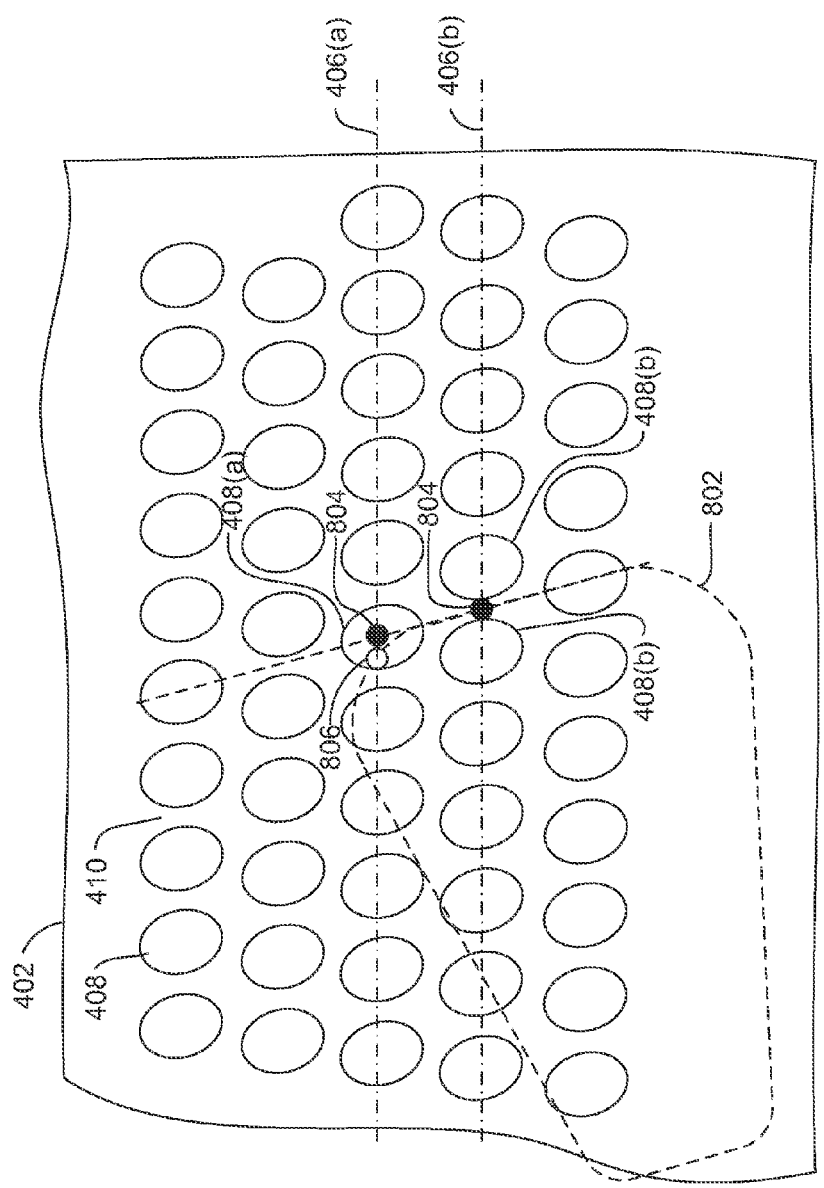
FIG. 8 is a top down view of a portion of a patterned magnetic media formed to account for skew and a magnetic write bubble wherein the magnetic recording system uses hyper-tracks along with shingling and wherein the magnetic write bubble is defined by a prior art trapezoidal write pole.

FIG. 8 shows a bit patterned media 402 at a location on a disk wherein the magnetic islands are formed in a skewed orientation in a system using a standard trapezoidal write pole to perform hypertrack, shingled recording. A standard trapezoidal write pole results in a write bubble 802 as shown in FIG. 8, having rounded corners. Whereas in FIG. 5, the write bubble 404 was symmetrically oriented over the two tracks 406(a), 406(b) to which data is to be recorded, in FIG. 8, the write bubble is offset from the data tracks 406(a), 406(b) so that recording occurs only on one side of the write bubble 802. In FIG. 8, the solid black dots 804 indicate the locations where it is desire that writing should take place. However, because the leading edge of the write bubble 802 is rounded at the corners and the write bubble is not symmetrically located over the tracks 406(a) and 406(b), the actual write location of writing at the corner is offset from the desired location. In FIG. 8, this actual write location of writing is indicated by the non-solid circle 806. This offset of the actual location of writing destroys the phase relationship of the writing to the two tracks 406(a) and 406(b) and as result such a hypertrack shingled writing will not function properly.

Figure 9:
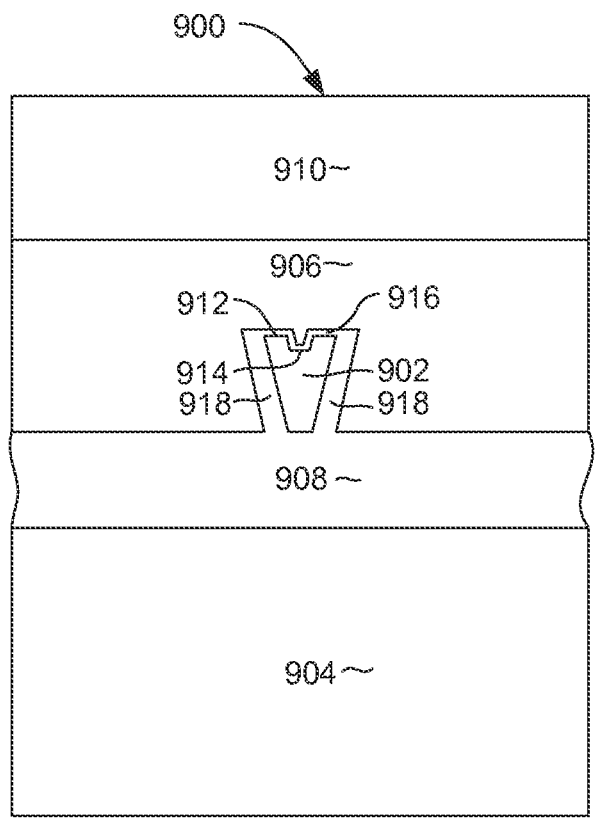
FIG. 9; is an ABS view of a magnetic write head according to an embodiment of the invention.

The present invention overcomes this problem using a write head that allows hypertrack recording in a shingled magnetic recording system on bit patterned media. FIG. 9 is an air bearing surface (ABS) view of magnetic write head 900 according to an embodiment of the invention. It should be noted that a side view of the magnetic head 900 could be similar to the view of the write head 200 shown in FIG. 2. With reference to FIG. 9, the write head 900 includes a magnetic write pole 902, a magnetic return pole 904 and may include a trailing magnetic shield 906 that can wrap around the magnetic write pole 902 to provide side shielding to prevent stray fields from inadvertently being emitted toward the magnetic medium. A non-magnetic, electrically insulating material such as alumina 908 can be provided to fill the space between the write pole 902 and return pole 904 at the ABS. In addition, a trailing return pole 910 may be connected with the trailing magnetic shield 906.

In FIG. 9, it can be seen that the write pole 902 has a trailing edge 912 that is provided with a centrally disposed notch 914. A non-magnetic trailing gap 916 separates the trailing edge of the write pole 902 from the trailing shield 906, and non-magnetic side gap layers 918 can be provided to separate the sides of the write pole 902 from the wrap-around portions of the shield 906. The trailing portion of the shield 906 can be constructed to conform to the notch 914 formed in the trailing edge 912 of the write pole 902.

The notch 914 formed in the trailing edge 912 of the write pole results in a lobed write bubble, which can be seen in FIG. 10. FIG. 10 shows a bit patterned media 402 constructed for hyper track recording and having a skew adjusted pattern of islands 408 such as described above. In FIG. 10 it can be seen that the write pole 902 described above results in a write bubble 1002 as shown in FIG. 10. The write bubble 1002 has convex lobes 1004 formed at the outer corners of the write bubble and has a concave portion at the center of its trailing edge. The write head 902 (FIG. 9) and resulting write bubble 1002 (FIG. 10) are designed for shingled magnetic recording wherein the recording occurs at one side of the write bubble, with the other side of the write bubble 1002 extending over other data tracks. As can be seen, the write locations over data islands 408(a), 408(b) can be symmetrically located within one of the convex lobes 1004, thereby providing the necessary phase relationship between the two tracks 406(a), 406(b).

In FIG. 10 it can be seen that the lobe 1004 has a convex shape that resembles the curved trailing edge of the round write bubble represented in FIG. 7. Therefore, it can be seen that if the relative phase of the actual write locations 412 are not properly located for each of the data tracks 406(a), 406(b), they can be adjusted by laterally offsetting the write bubble 1002 in a manner similar to that by which the generally round write bubble 602 of FIG. 7 was offset. Only a slight offset is needed to bring the data write points 412(a), 412(b) into proper alignment with the data islands 408(a), 408(b). To this end, the data recording channel electronics and servo electronic 125 (FIG. 1) can include circuitry that is designed to make this radial adjustment of the write head location in order to carry out this effect.

It should be pointed out that while one side of the write bubble 1002 is shown being used for recording in FIG. 10, either side of the write bubble can be used. Generally, however, when recording at inner diameter tracks the head will have a negative skew and the inner edge of the write bubble 1002 will be used for recording. Conversely, when recording outer diameter tracks the head will have a positive skew and the outer edge of the write bubble 1002 will be used for recording.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A system for magnetic data recording, comprising:
a magnetic media; and
a magnetic write head having a magnetic write pole, the magnetic write pole being configured to produce a magnetic write bubble on the magnetic media, the write bubble having first and second convex lobes;
wherein the write pole is configured with a trailing edge having a centrally disposed notch; and a trailing magnetic shield having a centrally disposed tab that extends toward the centrally disposed notch of the trailing edge of the write pole.

2. The system as in claim 1, wherein the write pole is configured to form the write bubble such that the first and second convex lobes are separated by a concave portion located there-between.

3. The system as in claim 1, wherein the write pole is configured to form the write bubble such that the first and second convex lobes are located at a trailing edge of the write bubble.

4. The system as in claim 1, wherein the write pole is configured such that the first and second convex lobes are located at outer corners of a trailing edge of the write bubble and are separated by a concave portion.

5. The system as in claim 1, wherein the magnetic media is a bit patterned media.

6. The system as in claim 1, wherein the magnetic media is a bit patterned media having magnetic islands that define a plurality of data tracks and wherein the write pole is configured such that the write bubble spans multiple data tracks.

7. The system as in claim 1, wherein the magnetic media is a bit patterned media having magnetic islands that define a plurality of data tracks and wherein the write pole is configured such that the write bubble spans more than two data tracks.

8. The system as in claim 1, wherein the system is configured for hypertrack magnetic recording.

9. The system as in claim 1, wherein the system is configured for shingled magnetic recording.

10. The system as in claim 1, wherein the radial location of the write head can be adjusted to align one of the outer lobes of the write bubble with two adjacent data tracks that are offset from one another.

11. A magnetic write head, comprising:
a magnetic write pole having first and second sides and a trailing edge;
a centrally disposed notch formed in the trailing edge of the magnetic write pole and
a trailing magnetic shield having a centrally disposed tab that extends toward the centrally disposed notch formed in the trailing edge of the magnetic write pole.

12. The magnetic write head as in claim 11, wherein the centrally disposed tab formed in the trailing magnetic shield extends into the centrally disposed notch.

* * * * *